Figure 1:
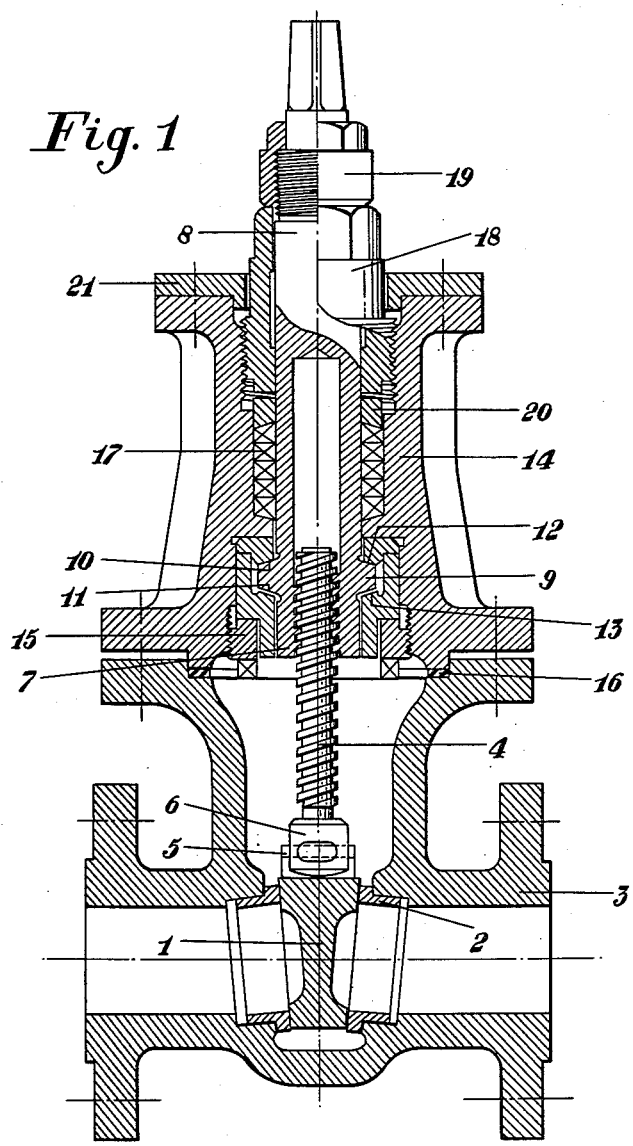

Nov. 20, 1962  A. CARFAGNA  3,064,674
GATE VALVE
Filed Aug. 27, 1958  5 Sheets-Sheet 3
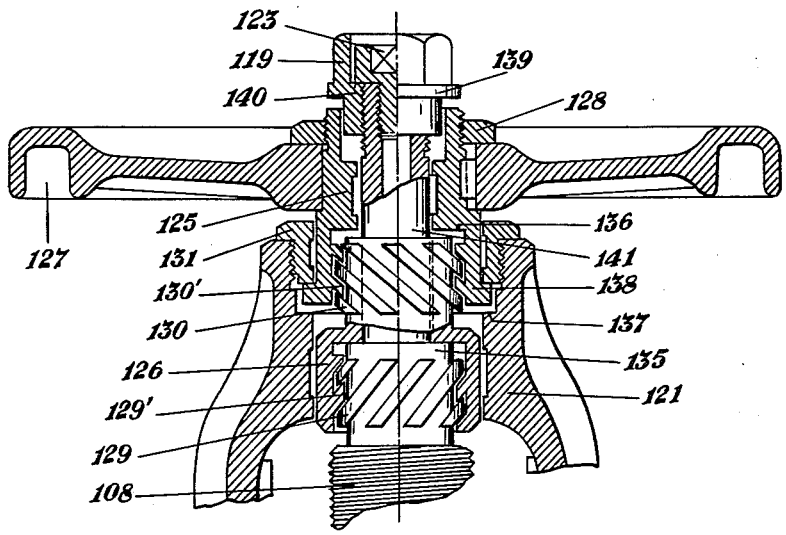
Fig. 2'
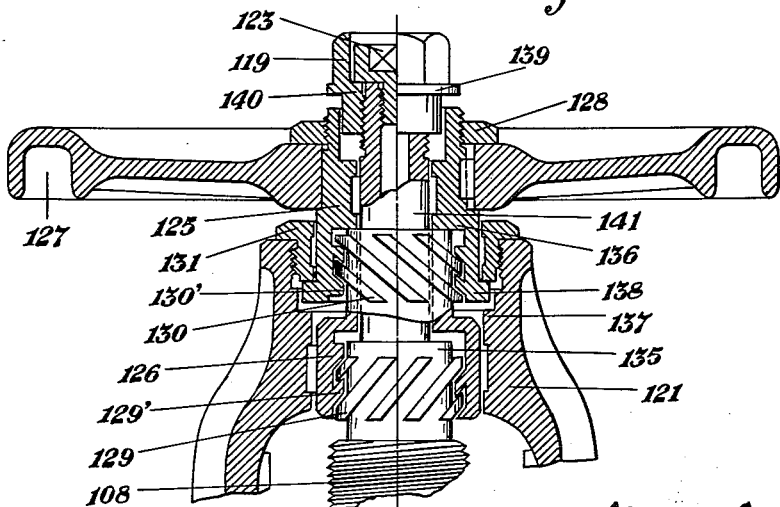
Fig. 2"
ARMANDO CARFAGNA
        INVENTOR.
BY Wendereth, Lind & Ponack
                ATTORNEYS

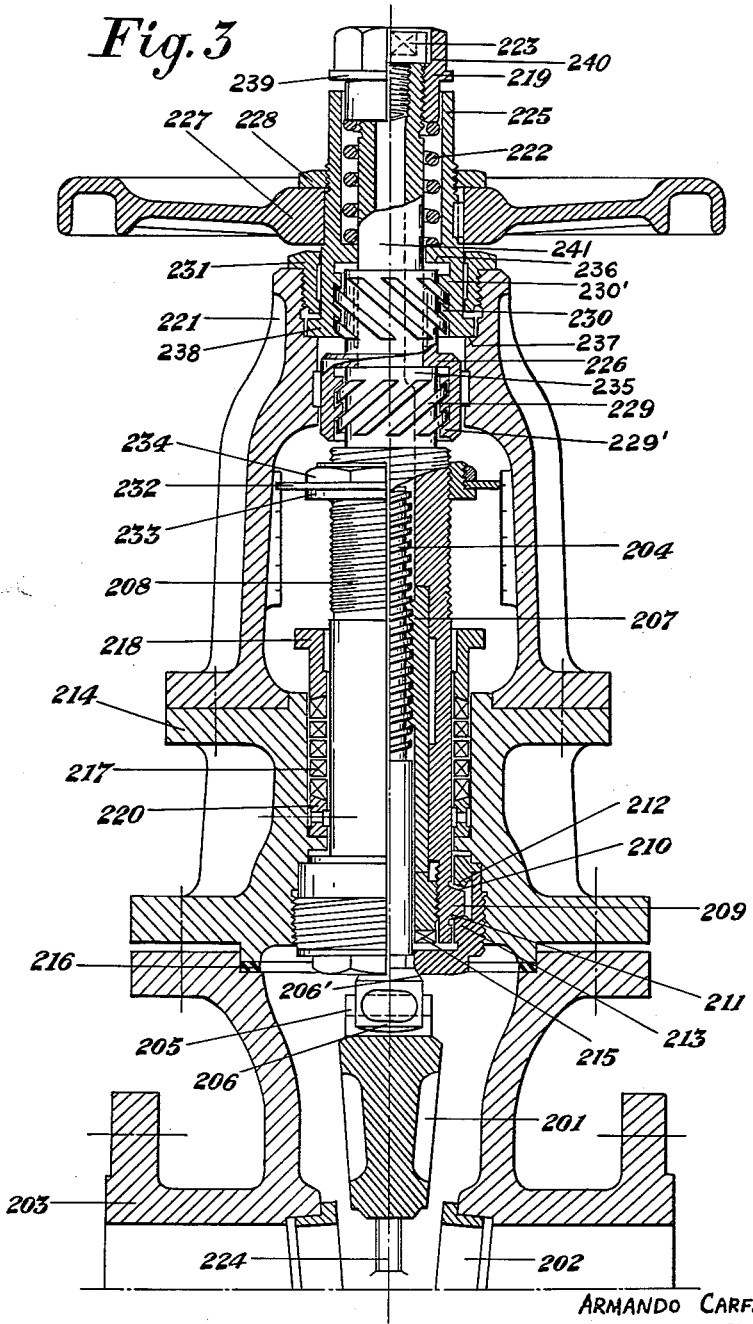

Nov. 20, 1962   A. CARFAGNA   3,064,674
GATE VALVE
Filed Aug. 27, 1958   5 Sheets-Sheet 5

ARMANDO CARFAGNA
INVENTOR.

BY Wenderoth, Lind & Ponack
ATTORNEYS

United States Patent Office 3,064,674
Patented Nov. 20, 1962

3,064,674
GATE VALVE
Armando Carfagna, 290a Via Aniello Falcone,
Naples, Italy
Filed Aug. 27, 1958, Ser. No. 757,550
Claims priority, application Italy Sept. 9, 1957
7 Claims. (Cl. 137—315)

The present invention relates to gate valves included in conduits carrying fluid under pressure for industrial purposes.

The object of the present invention is to provide a hermetical mechanical seal in the stuffing box of said valve, regardless of the extent to which the valve is opened and under all conditions of use in which a seal is required between the inside of the valve and the outside atmosphere. Another object of this invention is to provide means for insuring that the seal remains perfect during the actuation of the valve, both by means of a mechanical seal and with the aid of auxiliary packings which constitute a safety seal in addition to the mechanical seal.

During the opening and closing of the valve, the body of the mechanical seal seats on the seat therefor due to the effect of the inner pressure within the valve, the action of which, if necessary, is partially balanced by a thrust in the opposite direction produced by the operation of the valve and which is a function of the effort required for the actuation thereof. Therefore, the relative sliding movement of the body of the mechanical seal on the seat meets with minor frictional resistance and produces less wear of the sealing surfaces, the coupling pressure between said surfaces being reduced.

When the operation of the valve has been completed, the blocking action of the mechanical seal can be produced by contact with the gland of the auxiliary packings, or if necessary by a seat which is independent of the auxiliary packings. The latter arrangement permits easy replacement of said packings while the valve is operating and regardless of the extent of the opening thereof. In other modifications, the blocking action of the mechanical seal is brought about either by the action of a suitable means, or is produced by the reaction of a suitably pre-loaded resilient means, or by a combination of both these means.

When the valve is entirely open, its main inner members are isolated from the fluid in the conduit for protective purposes, and the lubrication provided for said members is thus more effective. Depending on the use of the valve and the nature of the handled fluid, said protection may be provided for the inner threads and for the threaded stem controlling the wedge shaped valve body, or also for the members of the mechanical seal.

This invention will be best understood by the following specification, reference being made to the attached drawings showing by way of example three different embodiments of the gate valve according to this invention.

Figure 2:
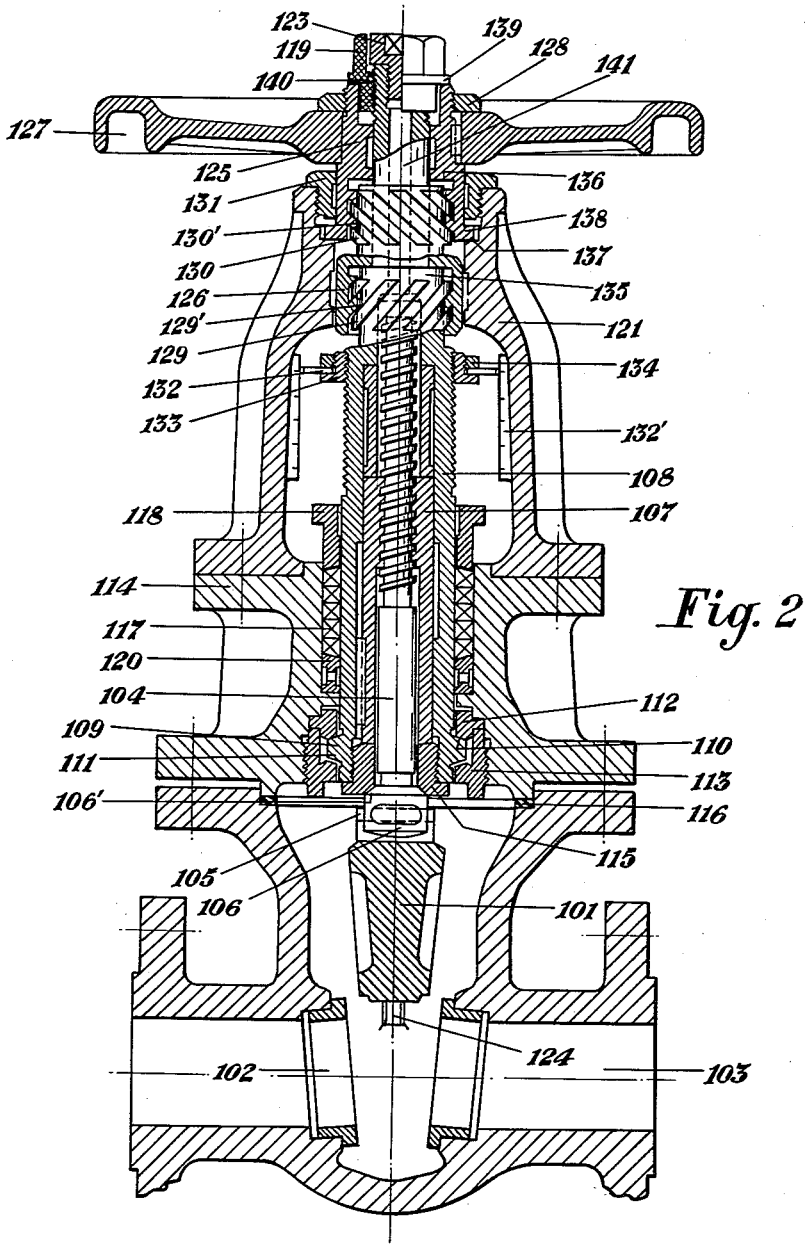
Figure 3:
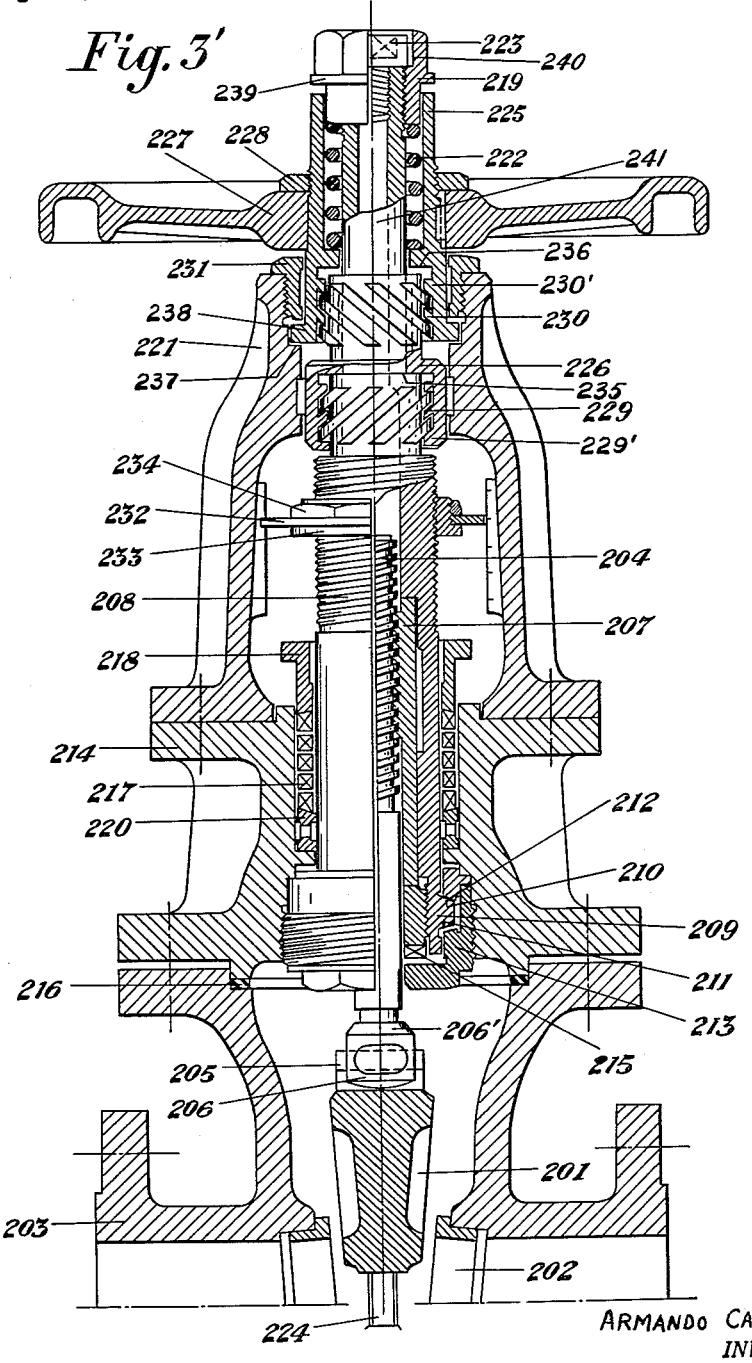

In the drawings:

FIG. 1 is an axial sectional view of the valve according to the invention;

FIGS. 2, 2' and 2" are axial sectional views of a different embodiment of the valve; and FIGS 3 and 3' are axial sectional views of a further embodiment of the valve in the fully open position and during opening.

With particular reference to FIG. 1, in the valve therein illustrated, the wedge-shaped gate 1 seats against the insert rings 2 in the valve casing 3. The wedge-shaped gate 1 is actuated by the threaded stem 4 to which it is articulated by means of two lugs on the gate 1 engaging in grooves in the head 6 on the end of the threaded stem 4. This arrangement makes the engagement of the sealing surfaces of the rings 2 and of the wedge-shaped gate 1 independent of the engagement of sealing surfaces of the valve. The threaded stem 4 engages inner screw threads 7 provided in an actuating rod 8. During the actuation of the valve, the threaded stem 4 is prevented from rotating about its axis because the head 6 abuts against the lugs 5 of the wedge-shaped gate 1 which in turn engages the valve casing 3 so as to be prevented from rotating. Therefore during the opening or closing of the valve, produced by rotating the control rod 8 by means of a hand wheel or any other similar means fastened to the upper end of said rod, the threaded stem 4 is caused to move axially, together with the gate 1, from one limit position, shown in FIG. 1 in full line, to the other limit position or in other words from the position of fully closed to the fully opening position, or to any intermediate position between said limit positions.

The control rod 8 is provided with an enlargement 9 having an upper surface 10 and a lower surface 11, both having a conical shape. The enlargement 9 is positioned between an upper seat 12 and a lower seat 13. Both these seats 12 and 13 are mounted in a chamber provided in the lower portion of the valve bonnet 14 and are sealed therein by a nut 15 which is threaded into the chamber bonnet 14. In the upper part of the bonnet 14, which is clamped to the valve casing 3 by means of bolts or the like, with a gasket 16 between the bonnet and the casing, is provided the stuffing chamber in which are positioned the auxiliary packings 17, the number, type shape, size and material of which are selected according to the fluid to be handled and to the pressure of this fluid in the conduit. The gland 18 is threaded into the bonnet 14 and is freely slidable within certain limits, on the control rod 8, when it is rotated, for example, by means of a wrench engaging its upper head which has been shown as having a hexagonal shape. The upward axial movement of the gland 18 is limited by the stop nut 19 which is fixed on the control rod 8, being threaded and pinned thereon, as well as by the abutment of the upper surface 10 of the enlargement 9 against the upper seat 12. With the parts in these positions, by tightening the gland 18 against stop nut 19, the control rod 8 is tensioned and therefore the side 10 of enlargement 9 is pressed against the seat 12, thus insuring a hermetic seal between the inner bore of the valve and the atmosphere, which seal is independent of the position of the gate 1 of the valve. The valve, when its movement has been completed, can be sealed by the mechanical seal by movement of the gland 18, which being displaced upwardly, no longer acts on the bushing 20 and on the auxiliary packings 17. When it is again desired to move the gate 1 of the valve, in order to open the gate 1 a different amount, the gland 18 is moved down causing it to advance until the auxiliary packings 17 are sufficiently loaded by the pressure of said gland on the bushing 20. The downward displacement of the gland 18 for loading the auxiliary packings 17 releases the control rod 8 and the enlargement 9, which nevertheless continues to hold the mechanical seal whether the fluid pressure within the valve is greater than atmosphere or less than atmosphere. More specifically, if the fluid pressure is greater than the atmospheric pressure, the upper surface 10 of the enlargement 9 will still press on the upper seat 12; if, on the contrary, the valve is included in a vacuum system, the vacuum within the valve causes the enlargement 9 to move down, establishing a contact, and therefore a seal between the lower surface 11 of the enlargement 9 and the lower seat 13. With the control rod in one or the other of these positions, the gate is actuated by causing the control rod 8 to rotate together with the enlargement 9, either surface of which slides on the surface of the seat with which it is in contact due to the pressure existing inside the valve. Simultaneously, the auxiliary packings 17 which remain loaded during this movement, ensure that a safety seal is maintained in addition to the mechanical seal as above described.

Finally, a cover 21 closes the upper end of the valve bonnet 14, to which it is clamped by means of bolts or the like, to protect the threads of the gland 18 against any extraneous matter which might adversely affect its operation.

FIGS. 2, 2′ and 2″ show a different embodiment of a gate valve according to this invention, wherein the system for maintaining the seal is actuated and wherein, when the valve is fully open, as shown in FIG. 2, both the internally threaded member and the threaded stem, controlling the gate are entirely protected from the fluid being handled.

With reference to FIG. 2, the wedge-shaped gate 101 seats against the insert rings 102 in the valve casing 103. The gate 101 is moved by the threaded stem 104 to which the gate is articulated by the two lugs 105 on the gate 101 which engage grooves in the articulation head 106 on the threaded stem 104. This type of connection makes the contact of the sealing surfaces of the rings 102 and of the wedge-shaped gate 101 independent of the other sealing surfaces of the valve. The screw threads of the stem 104 engage the internally threaded member 107 inserted within the actuating rod 108, or formed integrally therewith. The first mentioned arrangement permits the most suitable material to be used for the internally threaded member, and also allows the assembly to be carried out in the most suitable way depending on the requirements involved in the practical use to which the valve is put. In the embodiment shown in the drawing, the assembly of the parts is carried out from the lower part of the actuating rod 108, but the assembly could be suitably carried out from the top down, should particular requirements make it necessary to provide for the disassembly of the internally threaded member 107 without removing the cap 114 of the valve.

The internally threaded member 107 is keyed to the actuating rod 108, or said parts are connected to one another by any other equivalent connection. The blocking nut 115 blocks the member 107 and also has a seat thereon for the sealing surface 106′ provided on the head 106 on the threaded stem 104. When the valve is wide open, as shown in FIG. 2, said sealing surface 106′ seals against the seat provided on the blocking nut 115. Therefore, the internally threaded member 107 as well as the threaded stem 104 are protected from the action of the fluid in the conduit and a more effective lubrication of the threads can be maintained. To this end, the actuating rod 108 is axially bored and is closed at its upper end by a threaded plug 123. During the actuation of the valve, the internally threaded member 107 rotates with the rod 108 while the threaded stem 104 moves axially, being prevented from rotating by the head 106 abutting the two lugs 105 on the gate 101. The gate in turn engages in grooves (not shown) in the guide 124 on the valve casing 103. The actuating rod 108 has integral therewith an enlargement 109 forming part of the mechanical seal and having an upper surface 110 and a lower surface 111 having a cone shape or the like. Said projection 109 is positioned between an upper seat 112 and a lower seat 113. The lower seat 113 threads into a recess in the valve bonnet 114 and holds the upper seat and suitable gaskets (not shown) in position.

The bonnet 114 is clamped to the valve casing 103 by means of bolts with a gasket 116 between it and the casing, and is provided with an axial cavity extending therethrough and forming a lower chamber and an upper chamber. In this lower chamber are fitted the upper seat 112 and the lower seat 113, the lower seat 113 being threaded into the lower chamber to hold seat 112 in position. The upper chamber forms the stuffing box wherein are located the auxiliary packings 117. These packings, which are of the type, number and size suitable for the fluid being handled, are compressed by the gland 118. At the bottom of the stuffing box there is a lantern ring 120, in register with which is provided a suitable system for lubricating the packings and the sealing faces of the mechanical seal, said system extending into said ring through the bonnet 114.

The valve is provided with a pointer 132 indicating the extent of opening. The pointer 132 is mounted on the nut 133 which is threaded on the actuating rod 108. Due to the movement of said rod, the pointer moves axially along suitable marked guides 132′ on the bridge 121 of the valve. When the valve is fully shut, the pointer 132 is moved as far towards the gland 118 as possible, and therefore it could hinder the replacement of the auxiliary packings 117. To avoid such a drawback, according to the invention the pointer can be moved upwardly with no change of the position of the gate 101 and therefore without rotation of the rod 108. It is only necessary to unscrew the lock nut 134 and remove the pointer 132 from the nut 133. The nut 133 is then moved upwardly to the desired location, by causing said nut 133 to rotate with respect to the rod 108. When replacement of the auxiliary packings 117 has been carried out, the pointer 132 is reassembled at its previous location.

The upper portion of the actuating rod 108, remote from the enlargement 109, has thereon a right handed multiple thread worm 129 and a cylindrical portion 141 the outer end of which is threaded. The junction between this cylindrical portion, having a diameter less than that of the portion where worm 129 is provided, and the portion of the rod on which worm 129 is provided forms on the rod 108 a stop 135 having an annular flat surface. The worm 129 is engaged by the corresponding inner threads 129′ of a floating bushing 126. This bushing extends upwardly around cylindrical portion 141 and has on the outer surface of this extension a multiple thread worm 130 which is similar to the worm 129 but is left handed. The worm 130 in turn engages the corresponding inner threads 130′ of a control bushing 125. The control bushing 125 is slidable relative to the terminal cylindrical portion 141 of the actuating rod 108 and has a flange 138 thereon positioned between a stop 137 formed at the bottom of a recess provided within the bridge 121 and a clamping nut 131. The clamping nut 131 closes the top of this recess and has an axial recess through which projects the control bushing 125. Onto the portion of the bushing projecting through the nut 131 is keyed the hand wheel 127, the hand wheel being held in place by clamping nut 128. The floating bushing 126 is also slidable relative to the cylindrical end portion 141 of the actuating rod 108 and has an internal face abuttable against the stop member 135 on rod 108 and has the end abuttable against the stop face 136 on the control bushing 125, the face 136 being at the bottom of the recess in which the inner multiple thread worm 130′ is provided.

The threaded end of the actuating rod 108 projects from the upper end face of the bushing 125 and has threaded thereon the locking nut 119. The latter has a collar 139 abuttable against the upper end face of bushing 125 and has a recess 140 in which is positioned the head of a plug nut 123 threaded into the upper end of actuating rod 108. Locking nut 119 can be moved to either position by being manually rotated. To this end the upper portion of the nut 119 has a hexagonal shape to accommodate a wrench or a similar actuating means.

With particular reference to FIG. 2, when the opening or closing operation has been completed, the locking nut 119 abuts the control bushing 125. The latter, in turn abuts to the stop 137 in the bridge 121, so that the enlargement 109 is held tightly against the upper seat 112. Thus, the above parts will be in said arrangement when the gate 101 has been already placed in the required position of the valve, which in FIG. 2 is for example in the fully opened position.

With reference to FIG. 2' and FIG. 2" showing the device during either the opening or during the closing operation of the valve, the locking nut 119 abuts the plug nut 123 and the other parts forming the device cooperate with one another to rotate the rod 108 and to impart thereto an axial force opposing the pressure of the fluid acting from inside of the valve towards the enlargement 109.

With particular reference to FIG. 2', during the opening operation, during which the hand wheel 127 is rotated in the clockwise direction, the floating bushing 126 rotates until it abuts the stop member 135, since the worm 129 is right handed, and the control bushing 125 rotates until it abuts the clamping nut 131, since the worm 130 is left handed.

With the floating bushing and the control bushing in these positions, the actuating rod 108 rotates under the action of the force that the worm 130' on the control bushing 125 transmits to the teeth of the worm 130 on the floating bushing 126. Since these worms are left handed the axial component of said force is directed towards the valve casing 103.

With particular reference to FIG. 2", during the closing operation, during which the hand wheel 127 is rotated in the counterclockwise direction, the floating bushing 126 rotates until it abuts the stop 136 on the control bushing 125, since the worm 130 is left handed, and the bushing 125 rotates until it abuts the clamping nut 131 since the worm 129 is right handed.

Under these conditions the actuating rod 108 rotates under the action of the force that the worm 129' on the floating bushing 126 transmits to the teeth of the worm 129. Since these worms are right handed, the axial component of this force is directed also in this case, against the valve casing 103.

Thus during the above operations, when the fluid being handled is under pressure greater than atmosphere, the enlargement 109 is in sliding contact with the upper seat 112 under the influence of the fluid pressure within the valve which is partially offset by the above described axial force opposing the fluid pressure, so that the seal is ensured even when there is a reduced pressure holding the sealing faces in contact.

On the other hand, when the pressure of the fluid being handled is less than atmosphere, when the blocking nut is unscrewed, the actuating rod 108 will be drawn down until enlargement 109 is against lower seat 113. It will remain there during rotation of the actuating rod 108 until blocking nut 119 is again screwed down against control bushing 125 to draw the enlargement 109 up against upper seat 112.

FIGS. 3 and 3' show a third embodiment of the valve according to this invention in which there is a spring around the upper end of the actuating rod, and in which, when the valve is in the full open position, as shown in FIG. 3, both the internally threaded actuating rod and the threaded stem as well as the sealing faces of the mechanical seal are protected from the fluid being handled.

It is to be noted that this valve is for the most part identical to that shown in FIGS. 2, 2' and 2", so that a full description is deemed unnecessary.

More specifically, the nut 219 and the control bushing 225 have a spring 222 therebetween. This is positioned within the bushing 225 so as to be compressed between said bushing and the nut 219, which, in turn abuts the head of the plug nut 223.

During both the opening and closing operations as well as when the valve is opened or closed, the control bushing 225 and the actuating rod 208 are under the influence of the spring 222.

With reference to FIG. 3' during the opening operation, during which the hand wheel 227 is rotating in the clockwise direction, the floating bushing 226 rotates until it abuts the stop member 235 since the worm 229 is right handed and both the control bushing 225 and the actuating rod 208 are under the influence of the axial component of the force transmitted by the left handed worms 230' and 230.

While said axial component of the force which acts on the actuating rod 208 is directed toward the valve casing 203, the reaction force is directed against the control bushing 225 in the reverse direction, so that on one hand it reduces the contact pressure between the enlargement 209 and the upper seat 212, and on the other hand it reduces the contact pressure between the enlargement 238 on the control bushing 225 and the stop 237 on the bridge 221.

As soon as the opening operation is completed and the hand wheel 227 is no longer rotated, the axial component is no longer present, so that the contact pressure between the enlargement 209 and the upper seat 212 is increased due to the pressure of fluid in the valve, and the pressure contact between the enlargement 238 of the control bushing 225 and the stop 237 is also increased due to spring 222.

The above discussion concerning the opening operation is equally applicable to the closing operation with the exception that in this case floating bushing 226 rotates until it abuts the stop member 236 and both the control bushing 225 as well as the actuating rod 208 are acted on by the axial component of the force transmitted by the right handed worms 229 and 229'.

Another change in the embodiment of FIGS. 3 and 3' is that the nut 215 has the sole function of holding the internally threaded member 207 in position, while the member 213, in addition to forming the lower seat for the lower sealing face 211 of the enlargement 209, provides an external seat for the sealing face 206' provided on the head 206 on the threaded stem 204.

When the valve is in the full open position, as shown in FIG. 3, the mechanical seal is ensured by enlargement 209 which seats on the lower seat 213 as well as by sealing face 206', which seats on the external seat on the member 213.

I claim:

1. A gate valve for industrial use in a pipe containing a fluid under pressure, said valve comprising a valve casing having a valve seat therein, a wedge-shaped gate, a valve bonnet fastened to the said valve casing and having an axial chamber therein, an upper valve seat and a lower valve seat in the said axial chamber, an actuating rod rotatably and slidably positioned in the said axial chamber and having an annular enlargement projecting therefrom and having an upper and a lower surface cooperating with the two said seats in the said axial chamber to form a mechanical seal inside the said axial chamber, said actuating rod having a threaded axial bore, a controlling rod articulated to the said gate and having its outer surface threaded and engaged with the threads of the said actuating rod, a plurality of sealing packings around the said actuating rod and positioned in the said axial chamber, an actuating rod tensioning member in said valve bonnet and axially movable relative to the said actuating rod, and means associated with the said actuating rod and engageable by said tensioning member for locking said enlargement against one of the two seats in the said axial chamber after the operation of the gate valve.

2. A gate valve for industrial use in a pipe containing a fluid under pressure, said valve comprising a valve casing, a wedge-shaped gate in said casing, two valve seats in the said body, said gate being movably mounted in said casing for sealing contact with said seats, a valve bonnet mounted on the said valve body and having an axial chamber extending therethrough, said chamber having an enlarged annular portion forming in the said bonnet a lower chamber opening into said casing, an actuating rod rotatably and slidably positioned in the said axial chamber, the upper end of the said rod extending out of said bonnet, actuating means associated with the said upper end of the said actuating rod, the said rod having the lower portion within the said lower chamber, an annular enlargement on said rod within said lower chamber and having an upper surface and a lower surface, said lower seat being on the part of the said enlargement toward said body and said upper surface being on the other side of said enlargement and facing in the opposite direction, two annular members secured in the said lower chamber in the said bonnet and defining between them a hollow space in which said enlargement is positioned, said annular members having an upper valve seat and a lower valve seat thereon, said valve seats being opposed to said upper and said lower surfaces respectively of said enlargement, said actuating rod having a threaded axial bore, locking nut means in the upper end of said actuating rod, said bore communicating with the inside of the said casing, a control stem articulated to the wedge-shaped gate and being exteriorly threaded and engaging the inner threads of the actuating rod, guides in the said valve casing guiding the said gate and preventing the said gate and the said control stem from rotating, a plurality of sealing packings around the said actuating rod and positioned in the central portion of the said axial duct in the said bonnet, said actuating means being moveable toward the upper end of the actuating rod and engageable against said locking nut means to slide said actuating rod to lock said enlargement on the said actuating rod against the said upper valve seat in the said bonnet to ensure a mechanical seal independent of the fluid pressure in said valve and the position of the said gate.

3. A gate valve as claimed in claim 2, in which said actuating means comprises a gland around the upper end of the actuating rod engageable with said locking nut means fastened to the upper end of the said rod above the said gland, said gland being threadedly engaged with the said valve bonnet, said locking nut being positioned on said actuating rod to limit the axial movement of the said gland in a direction opposite to the direction in which the gland compresses said packings, the engagement of the said enlargement on the said upper valve seat limiting the axial movement of said actuating rod.

4. A gate valve as claimed in claim 2, in which said actuating means comprises a first bushing having a helical thread on the inside thereof, a helical thread on the outside of the upper part of the said actuating rod and engaging said helical thread on the said first bushing, said first bushing having another helical thread having a pitch opposite to that of the said helical thread on the inside of the said first bushing on the outside of the upper part of said first bushing, a second bushing having an enlarged axial chamber having a helical thread therein which engages the helical thread on the outside of the said first bushing, a hand wheel fastened to the said second bushing, a cap on the said bonnet, said cap having an upper axial cavity in which the said bushings are mounted, said second bushing being slidable on the said actuating rod, stop members in the said axial cavity in the said cap to limit the upward and downward movement of the said second bushing, said first bushing being slidable on the said actuating rod, an annular projection on said rod forming a stop member to limit the downward movement of the first bushing, the upward movement of the said first bushing being limited by the said second bushing, said two bushings transmitting to the said actuating rod the rotational force exerted on the said hand wheel to operate the gate valve, the said rotation being transmitted by means of one of the two helical threads of the said first bushing, the inclination of which exerts on the said rod a thrust proportional to the said force in a direction toward the gate, said locking nut means comprising a hand operable locking nut associated with the said second bushing and threaded on the upper end of the said rod above the said second bushing, said locking nut being positioned on said actuating rod to disengage from the said second bushing during the operation of the gate valve and to press said second bushing after the said operation of the gate valve, whereby said enlargement is locked against the said upper valve seat in the said bonnet.

5. A gate valve as claimed in claim 4, and a spiral spring bearing on the said locking nut on the upper end of the said actuating rod, said spring being located inside the axial cavity in the said second bushing, said axial cavity of the said second bushing having an annular ledge therein, said spring being held between the said ledge and said locking nut.

6. A gate valve as claimed in claim 1 and further comprising means for sealing off the threads in the bore of the said actuating rod from the action of the fluid under pressure when the wedge-shaped gate is in the fully open position, said means comprising a threaded ring nut threaded into the inner end of the axial bore of the said actuating rod, said threaded ring nut having an axial bore through which said controlling rod passes, said threaded ring nut having a circular valve seat with inclined walls facing the inside of the said valve casing, said controlling rod having at its lower end a surface having inclined walls positioned to move into sealing contact with the inclined walls of the said circular valve seat, whereby the flow of the fluid toward the axial bore of the actuating rod is prevented when the gate is fully open.

7. A gate valve as claimed in claim 1 which further comprises means for sealing off the threads in the bore of the actuating rod and the upper and lower seats in the said axial chamber in the valve bonnet from the action of th fluid under pressure when the gate is in the fully open position, said means comprising a threaded ring nut threaded into the lower part of the said valve bonnet, said threaded ring nut having an axial bore through which said controlling rod passes, said threaded ring nut having a circular valve seat with inclined walls facing the inside of the said valve casing, said controlling rod having at its lower end a surface having inclined walls positioned to move into sealing contact with the inclined walls of the said circular valve seat, whereby the flow of the fluid toward the axial bore of the actuating rod is prevented when the gate is fully open.

References Cited in the file of this patent

UNITED STATES PATENTS

| | | |
|---|---|---|
| 48,147 | Barber | June 13, 1865 |
| 1,374,774 | Solomon | April 12, 1921 |
| 2,109,801 | Parker | March 1, 1938 |
| 2,447,510 | Langdon | Aug. 24, 1948 |
| 2,765,143 | Best | Oct. 2, 1956 |

FOREIGN PATENTS

| | | |
|---|---|---|
| 141,084 | Sweden | June 30, 1953 |
| 450,387 | Great Britain | July 16, 1936 |